United States Patent [19]
Rubinstein et al.

[11] Patent Number: 5,153,769
[45] Date of Patent: Oct. 6, 1992

[54] SCANNING APPARATUS AND METHOD

[75] Inventors: Adam Rubinstein, Maccabim; Rafael Bronstein, Kfar Saba, both of Israel

[73] Assignee: Scitex Corporation Ltd., Herzliya, Israel

[21] Appl. No.: 722,012

[22] Filed: Jun. 27, 1991

[30] Foreign Application Priority Data

Jul. 9, 1990 [IL] Israel .......................................... 95008

[51] Int. Cl.$^5$ ............................................. G02B 26/10
[52] U.S. Cl. .................................... 359/226; 359/201; 359/204; 359/212; 358/489; 358/491
[58] Field of Search ............... 359/196, 197, 201, 203, 359/212, 226, 204; 250/234, 235, 236; 358/296, 489, 490, 491

[56] References Cited

U.S. PATENT DOCUMENTS

| | | | |
|---|---|---|---|
| 2,529,978 | 11/1950 | Thompson | 358/489 |
| 3,192,319 | 6/1965 | Murphy | 358/489 |
| 3,233,037 | 2/1966 | Foll | 358/489 |
| 3,523,160 | 8/1970 | Willey | |
| 3,527,883 | 9/1970 | Sobchak | 358/489 |
| 3,553,463 | 1/1971 | Penfield et al. | 358/491 |
| 3,729,248 | 4/1973 | Beduchaud | 359/204 |
| 4,494,821 | 1/1985 | Lewis et al. | 359/212 |

OTHER PUBLICATIONS

L. Beiser, "Generalized Equations for the Resolution of Laser Scanners", Applied Optics, vol. 22, No. 20, Oct. 1983, pp. 3149-3151.

Primary Examiner—Loha Ben
Attorney, Agent, or Firm—Ladas & Parry

[57] ABSTRACT

Scanning apparatus including a light source for providing at least one light beam, a medium for receiving the light beam and two helical optical apparatuses disposed between the light source and the medium for sequentially receiving the light beam and for directing the light beam towards the medium.

21 Claims, 8 Drawing Sheets

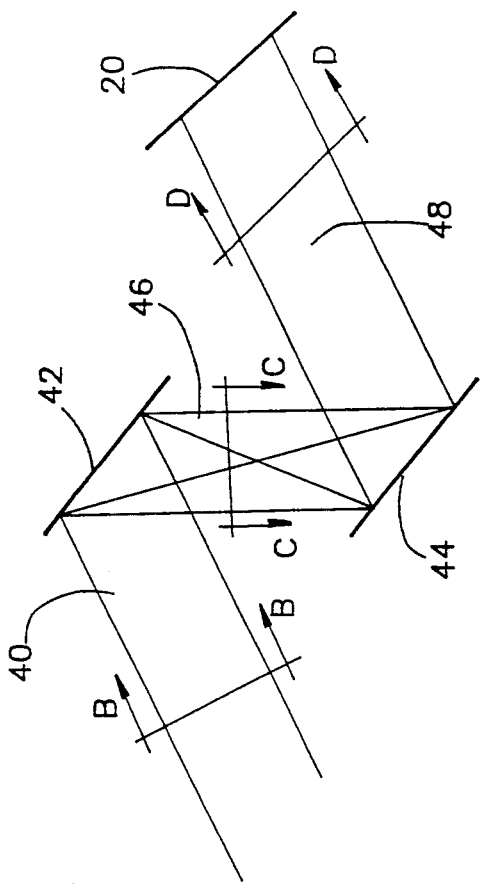
FIG.3A
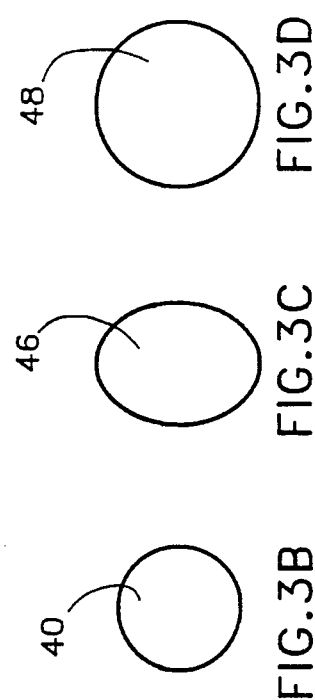
FIG.3B
FIG.3C
FIG.3D
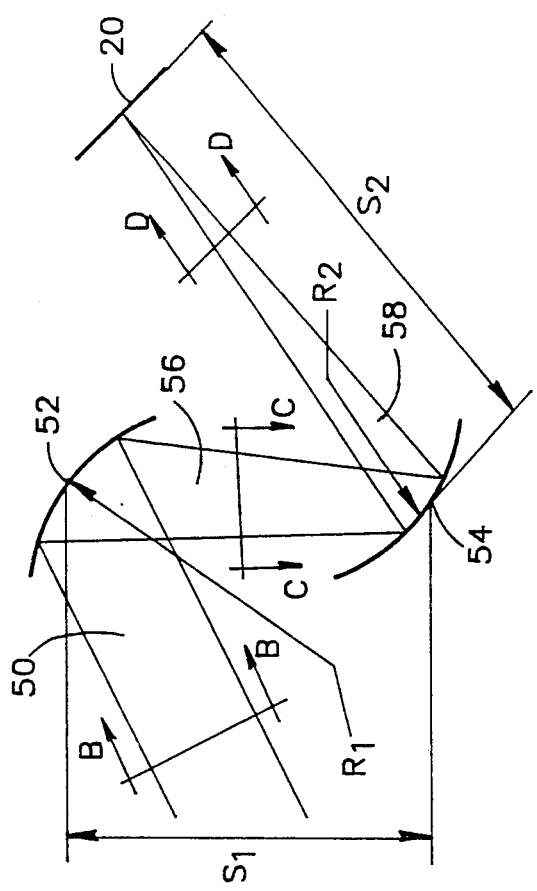
FIG.4A
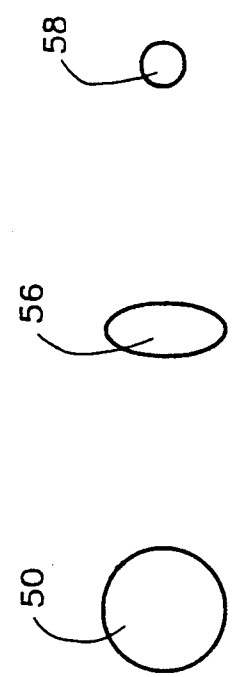
FIG.4B
FIG.4C
FIG.4D

SCANNING APPARATUS AND METHOD

FIELD OF THE INVENTION

The present invention relates to line scanners generally and to helical line scanners in particular where, for the purposes of this application, scanning refers to both a reading and a writing capability.

BACKGROUND OF THE INVENTION

Helical line scanners are known in the art. U.S. Pat. Nos. 3,523,160 and 4,494,821 describe optical scanning devices utilizing a flat surface helicoid reflector formed on a rotatable cylindrical drum. Such devices scan a line of a scanning medium by reflecting a light beam from the surface of the rotating helicoid reflector.

The helicoid reflector has advantages over existing scanners. As discussed in the article by Leo Beiser, "Generalized Equations for the Resolution of Laser Scanners", *Applied Optics*, Oct. 15, 1983, Vol. 22, No. 20, pp. 3149-3150, existing scanners use rotating pyramidal or polygonal mirrors inherently have format and resolution limitations. The helicoid reflectors have none of these limitations.

A single helicoid reflector is less prone to production errors thereby providing a scan without noticeable artifacts. However, by its nature, a flat helical surface cannot be completely flat. In fact, it inherently has a shape defined by a saddle function. Thus, a collimated light beam reflecting from such a surface becomes diverged.

The optical scanning device of U.S. Pat. No. 3,523,160 uses a lens after the helical surface to refocus the beam. The optical scanning device of U.S. Pat. No. 4,494,821 improves on the device of U.S. Pat. No. 3,523,160 so as to reduce the divergence of the light beam through the introduction of a narrow slit. The narrow slit is not advantageous since it produces a relatively large spot in the shape of a parallelogram.

Unfortunately, the prior art helicoid reflectors by themselves do not compensate for their existing aberrations. They require use of additional optical elements, such as the narrow slit of U.S. Pat. Nos. 4,494,821 or the lens of 3,523,160.

In order to provide a beam which is perpendicular to a scanning medium, a reflecting surface tilted to the axis of helix is desired. This angle is called the pitch angle.

As is known in the art, all helices have a pitch angle, being the angle the helical surface makes with the axis of the helix. The pitch angle is a function of the length L of the helix and its diameter D, as follows:

$$\tan \alpha = \pi D/L \qquad (1)$$

the longer the desired scan length, the larger the required diameter, where, for a 45° pitch angle, such as is utilized in the devices mentioned hereinabove, the diameter must be generally a third of the length. Thus, the physical construction of long scanning versions of the abovementioned devices becomes cumbersome.

SUMMARY OF THE INVENTION

It is an object of the present invention to disclose a helical scanning device, for both reading and writing, which provides some beam shaping and aberration compensation capabilities without the need for additional optical elements. It is a second object of the present invention to disclose a device which is capable of scanning flat and curved large format surfaces at high resolution.

There is therefore provided, in accordance with a preferred embodiment of the present invention, scanning apparatus including a light source for providing at least one light beam, a medium for receiving the light beam and two helical optical apparatus disposed between the light source and the medium for sequentially receiving the light beam and for directing the light beam towards the medium.

Moreover, in accordance with a preferred embodiment of the present invention, the two helical optical apparatus have first and second specularly reflecting helical surfaces. The first helical surface is operative for receiving the light beam from the light source and for directing it to the second helical surface and the second helical surface is operative for receiving the light beam from the first helical surface and for directing it to the medium. The first and second helical surfaces can have diameters of different sizes or can be of a generally identical size. Furthermore, the first helical surface preferably completes one turn per scan.

Still further, in accordance with a preferred embodiment of the present invention, the specularly reflecting surfaces are flat. Alternatively, each of the specularly reflecting surfaces can have a constant radius of curvature or a curvature defined by a higher than second order curve.

Additionally, in accordance with an alternative embodiment of the present invention, the two helical optical apparatus include two specularly reflecting helical surfaces combined in a single helicoid optical element. The apparatus of this alternative embodiment can additionally include a prism or two mirrors.

Further, in accordance with a further alternative embodiment of the present invention, the helical optical embodiment of the present invention, the helical optical apparatus includes a helicoid optical element housed within a cylindrical lens which is twisted to form a helix.

Moreover, there is provided, in accordance with an alternative embodiment of the present invention, scanning apparatus including a light source for providing at least one light beam, a single helical surface for receiving and reflecting the light beam and reflecting apparatus located generally close to the single helical surface for receiving the light beam from a first location on the single helical surface and for reflecting the light beam to a second location on the single helical surface. The apparatus additionally includes a medium for receiving the light beam from the second location. The reflecting apparatus preferably includes a prism or two mirrors generally but not necessarily placed orthogonal to each other.

Further, in accordance with the present invention, the medium is transparent and the apparatus also includes a detector located near the medium for detecting light through the medium.

Still further, in accordance with an alternative embodiment of the present invention, the medium is nontransparent and the apparatus also includes a detector located near the medium for detecting light reflecting from the medium.

There is provided, in accordance with a preferred embodiment of the present invention, a method of scanning a medium including the steps of providing at least one light beam, receiving the light beam on a first helical optical apparatus and reflecting and shaping it to a second helical optical apparatus, receiving the light beam on the second helical optical apparatus and reflecting and shaping it to the medium and repeating the step of providing and both steps of receiving while rotating the first and second helical optical apparatus in an identical direction.

Moreover, in accordance with an alternative embodiment of the present invention, the first helical optical apparatus is located inside the second helical optical apparatus. The step of repeating is performed while rotating in opposite directions.

Finally, there is further provided, in accordance with a further alternative embodiment of the present invention, a method of scanning a medium including the steps of providing at least one light beam, receiving the light beam on a helical surface and reflecting the light beam from a first location on the single helical surface to reflecting apparatus located generally very close to the single helical surface, reflecting the light beam from the reflecting apparatus to a second location on the single helical surface and receiving the light beam from the second location on the medium. The second location is generally coincident with the first location.

BRIEF DESCRIPTION OF THE DRAWINGS

The present invention will be understood and appreciated more fully from the following detailed description taken in conjunction with the drawings in which:

FIG. 2A shows a generally flat surface and FIG. 2B shows a generally curved cross-section;

FIG. 3A is a schematic illustration of the path of a light beam in the apparatus of FIG. 1A using helicoid optical elements with the cross-section of FIG. 2A;

FIGS. 3B, 3C and 3D are cross-sectional illustrations of the light beam as it approaches and reflects from the helical surfaces of FIG. 3A;

FIG. 4A is a schematic illustration of the path of a light beam in the apparatus of FIG. 1A using helicoid optical elements with the curved cross-section of FIG. 2B;

FIGS. 4B, 4C and 4D are cross-sectional illustrations of the light beam as it approaches and reflects from the helical surfaces of FIG. 4A;

DETAILED DESCRIPTION OF PRESENT INVENTION

Figure 1:
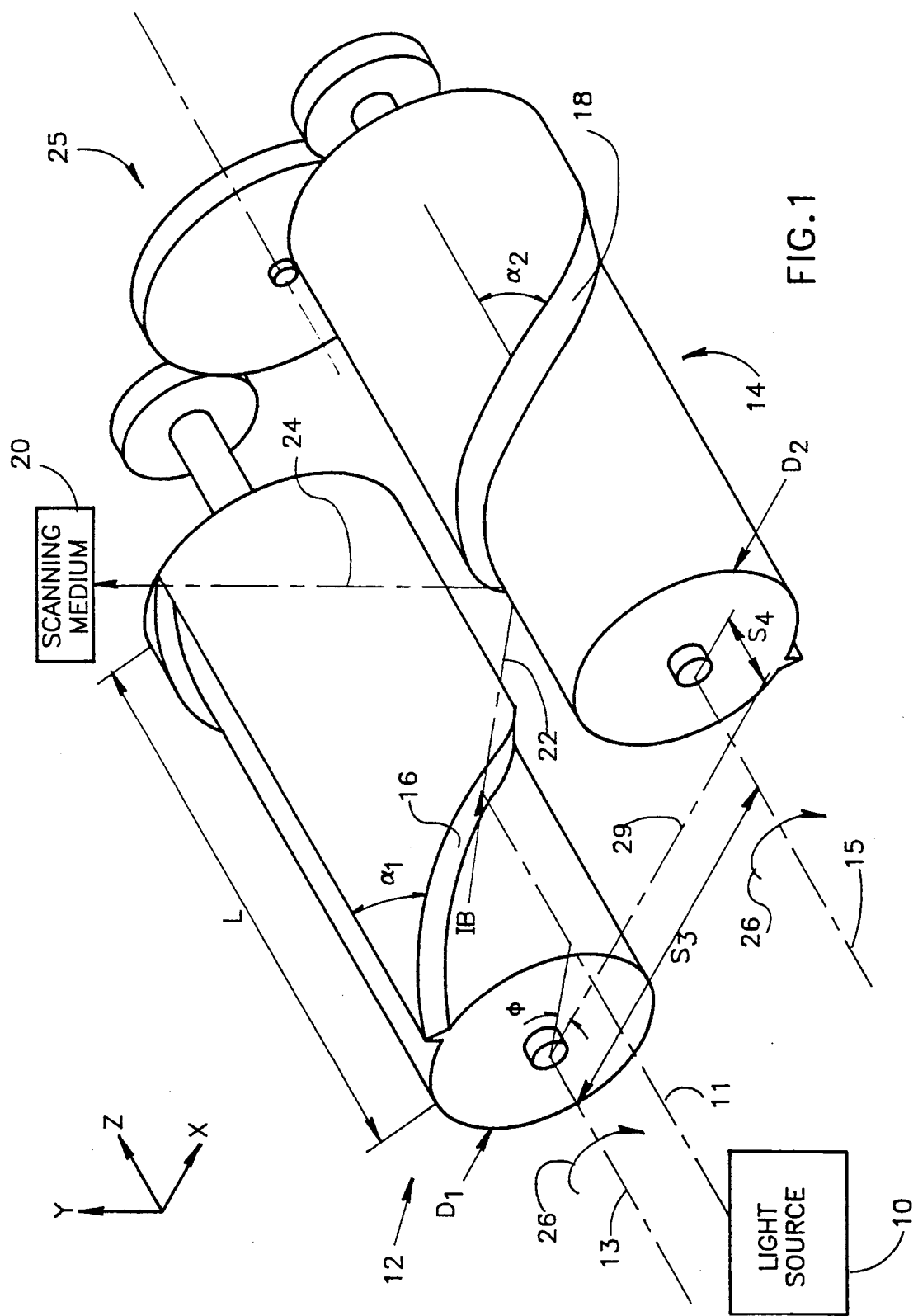
FIG. 1A is a schematic illustration of a scanning apparatus utilizing two reflective helicoid optical elements constructed and operative in accordance with the present invention.
FIG. 1B is a sectional illustration along a portion of a path of a light beam between the two reflective helicoid optical elements of FIG. 1A.

Reference is now made to FIGS. 1A, 1B, 2A and 2B. The scanning apparatus of the present invention comprises a light source 10, such as a laser, for providing a light beam 11 which is generally but not necessarily collimated and two helicoid optical elements 12 and 14 having specularly reflecting helical surfaces 16 and 18, respectively, for receiving the light beam 11 and for reflecting it onto a medium 20.

Alternatively, light source 10 can comprise a multiplicity of light sources which provide a multiplicity of light beams with slight angles between them. The following detailed description will discuss the operation of the apparatus of the present invention utilizing a single light beam 11, it being understood that light beam 11 can be replaced by a multiplicity of light beams without any loss of generality.

Light beam 11 is transmitted along an axis which is preferably parallel to axes of symmetry 13 and 15 of helicoid optical elements 12 and 14, respectively, which, in turn, are preferably parallel one to the other. If light beam 11 is replaced by a multiplicity of light beams, the central axis of the light beams is parallel to axes 13 and 15.

Typically, the axis of light beam 11 and the axes 13 and 15 are not coplanar; the axis of light beam 11 typically is at an angle $\phi$ to a line 29 between axes 13 and 15. The angle $\phi$ is known as the working point of the light beam 11 on the helical surface 16.

Light beam 11 impinges upon helical surface 16 and is reflected from there, as beam 22, onto helical surface 18. Helical surface 18 then reflects beam 22, as beam 24, onto the medium 20.

Beam 24 is scanned along a line on medium 20 through the rotation of helicoid optical elements 12 and 14 in an identical direction, marked by arrows 26. It will be noted that any direction of rotation is possible so long as both elements 12 and 14 rotate in that direction.

In order to scan another line on medium 20, medium 20 is translated a distance of one line width generally perpendicular to the scan direction via translating means (not shown) known in the art, such as lead screws, linear motors and rotating drums. Alternatively, for a scanning apparatus with a multiplicity of light sources, medium 20 is translated a distance of a number of line widths equal to the number of light sources. In a further alternative embodiment, medium 20 can be fixed and the scanning apparatus comprising the two helicoid optical elements 12 and 14 can be translated as required.

It will be appreciated that medium 20 is not necessarily flat; it merely has to have the scanned line maintained at a constant distance from the scanning apparatus.

Helicoid optical elements 12 and 14 are rotated and synchronized through well known rotating means 25, such as geared motors or motors with closed servo loops.

In order to scan a single line or several lines in the case of a multiplicity of light sources, helical surface 16 is restricted to forming a single turn of a helix, or, if necessary, slightly less than a single turn, over a length L of helicoid optical element 12. Helical surface 18, on the other hand, can be formed of a single helix over length L with a multiplicity M of turns, wherein M is an integral multiple of the portion of a turn of helical surface 16. Accordingly, the angular velocity of helicoid optical element 14 is M times the angular velocity of helicoid optical element 12. It will be noted that, although not shown in FIG. 1A, the second helicoid optical element 14 can be of any length which is greater than or equal to length L.

Helical surfaces 16 and 18 have pitch angles $\alpha_1$ and $\alpha_2$ which are defined such that, at the point of reflection, the reflecting surfaces are generally orthogonal to each other. This partially compensates for aberrations in beam 22 caused by the fact that the surface 16 by its nature is not flat. This is illustrated in more detail in FIG. 1B which is a sectional view showing projections 17 and 19 of the helical surfaces 16 and 18, respectively, along the axis of light beam 22. An angle $\theta$, the angle between projection 17 and 19, is arranged to be as large as possible where 90° is its maximal value.

It will be noted that, in addition to having pitch angles $\alpha_1$ and $\alpha_2$, helical surfaces 16 and 18 are phase shifted from each other. The size of the phase shift is defined by the condition that beam 22 hit helical surface 18 and depends upon the geometry of the helical surfaces 16 and 18 and a distance $S_3$ between the axes 13 and 15.

The length L and pitch angle $\alpha_1$ of helical surface 16 define its diameter $D_1$. In accordance with the condition, illustrated in FIG. 1B, that the angle $\theta$ be as large as possible, the pitch $\alpha_2$ of the helical surface 18 is defined. The pitch angle $\alpha_2$, in conjunction with the multiplicity of turns M and the length L, defines a diameter $D_2$ of helicoid optical element 14 in accordance with the following equation:

$$\tan \alpha_2 = M\pi D_2 / L \quad (2)$$

The larger the value of M, the smaller $D_2$ will be. It will be noted that in FIG. 1A, the diameters $D_1$ and $D_2$ are identical, as are the pitch angles $\alpha_1$ and $\alpha_2$.

It will be appreciated that light beam 22 typically does not traverse the distance $S_3$ in a direction perpendicular to the axes 13 and 15. Therefore, helicoid optical element 14 is shifted a distance $S_4$ from helicoid optical element 12.

Figure 2A:
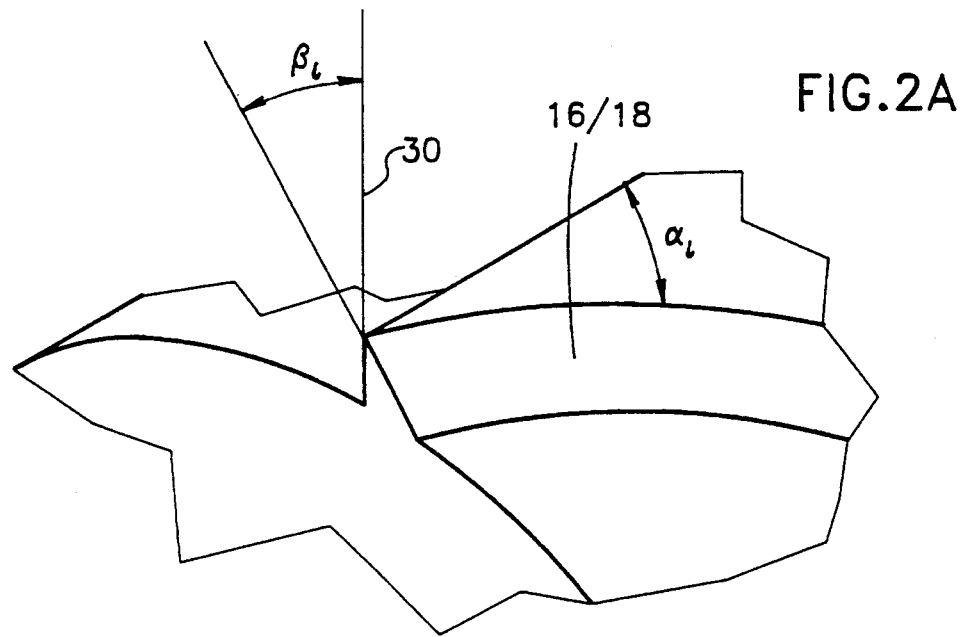
FIGS. 2A and 2B are cross-sectional views of two embodiments of the surface of the helicoid optical elements where
Figure 2B:
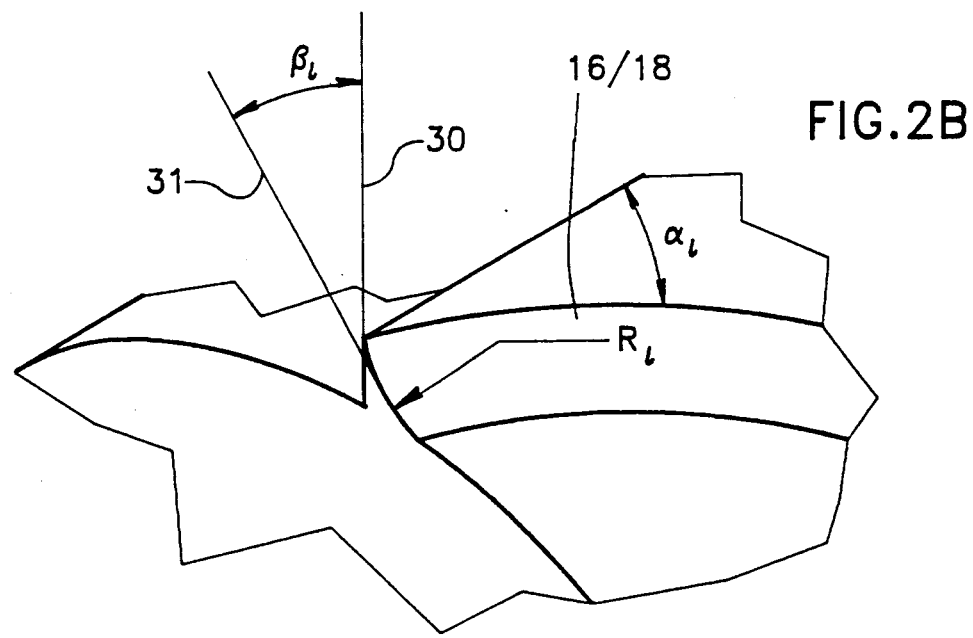
Figure 1B:
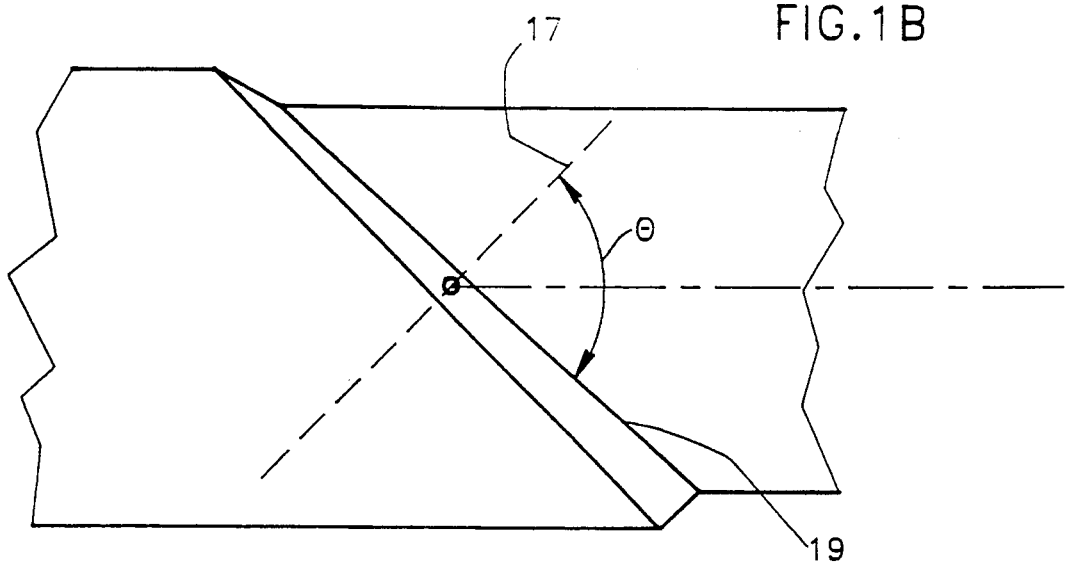

In accordance with a preferred embodiment of the present invention and as shown in FIGS. 2A and 2B, each helical surface 16 or 18 is typically inclined by an inclination angle $\beta_i$ to the extension 30 of a radial line of its respective helicoid optical element 14 or 16, where i is 1 or 2. $\beta_1$ is the inclination angle of helical surface 16 and $\beta_2$ is the inclination angle of helical surface 18. $\beta_1$ and $\beta_2$ are defined, for convenience, in a plane which is perpendicular to the axes 13 and 15. They may be unequal.

It will be noted that the combination of inclination angles $\beta_1$ and $\beta_2$ enables light beam 22 to be directed to impinge upon helical surface 18 and light beam 24 to leave surface 18 generally perpendicular to the axis 15, thus enabling light beam 24 to impinge upon medium 20 in a direction which produces the maximal aberration reduction.

In accordance with an alternative embodiment of the present invention shown in FIG. 2B and described in more detail with respect to FIGS. 4A-4D, helical surfaces 16 and 18 can be concave so as to focus light beam 11 or 22, respectively. Helical surfaces 16 and 18 can have fixed radii of curvature $R_i$, as shown in FIG. 2B, or the curvature can be a higher than second order curve. The inclination angles $\beta_i$ in this embodiment are defined as the angle between a tangent 31 to the concave surface 16 or 18 at its middle and the extension 30.

Reference is now made to FIGS. 3A-3D and 4A-4D. FIG. 3A illustrates, in detail, the path of an input light beam, marked 40, as it reflects from helical surfaces 16 and 18 with flat surfaces such as are shown in FIG. 2A. The helical surfaces 16 and 18 are marked as surfaces 42 and 44, respectively.

FIG. 3B illustrates the cross-section of light beam 40 before it reflects from helical surface 42. It will be noted that the cross-section is generally round. Light beam 40 reflects from surface 42 as light beam 46 whose cross-section is shown in FIG. 3C. Since, as mentioned hereinabove, helical surface 42 is a saddle shape, it causes divergence in any beam which it reflects. Thus the cross-section of light beam 46 has a shape of a diverged ellipse.

In accordance with the present invention, the divergence shown in FIG. 3C is generally cancelled when light beam 46 is reflected from helical surface 44 as a light beam 48 which impinges upon the medium 20. Helical surface 44 causes a divergence of light beam 46 in a perpendicular direction to the divergence caused by helical surface 42; thus, the resultant cross-section, shown in FIG. 3D, is a nearly collimated beam 48 whose diameter is larger than that of beam 40.

The path and shape of an input light beam, marked 50, as it reflects from helical surfaces 16 and 18 with curved concave surfaces such as described with reference to FIG. 2B, is shown in FIGS. 4A-4D in a manner similar to that for the generally flat surfaces of FIG. 2A. The helical surfaces 16 and 18 are marked as surfaces 52 and 54, respectively.

FIG. 4B illustrates the cross-section of light beam 50 before it reflects from helical surface 52. Light beam 50 reflects from surface 52 as light beam 56 whose cross-section is shown in FIG. 4C. Since helical surface 52 is concave, light beam 56 is shaped in a first direction into a beam with a generally oval cross-section.

In accordance with the present invention, helical surface 54 further shapes light beam 56 in a second direction generally different from and typically orthogonal to the first direction of shaping, therefore to produce a small, generally round cross-section spot as shown in FIG. 4D. This dynamic shaping serves to reduce aberrations in the scanning light beam. It will be appreciated that since the reflective surfaces 52 and 54 are helical, this dynamic shaping occurs equally throughout a scan line.

The focal length of each helical surface 52 and 54, is defined in accordance with the distances of the helical surface 52 or 54 from the medium 20 so as to render the beam its smallest cross-section on the medium 20. As shown in FIG. 4A, the distance of helical surface 52 to medium 20 is the sum of a distance $S_1$ between the two helical surfaces 52 and 54 and a distance $S_2$ between helical surface 54 and medium 20. The distance of helical surface 54 to medium 20 is just $S_2$.

As is known in the art, the focal lengths of surfaces 52 and 54 define their curvature. For constant radii of curvature $R_i$, the radius of curvature $R_1$ of helical surface 52 is typically larger than the radius of curvature $R_2$ of helical surface 54.

A helical optical element 12 or 14 can be manufactured of any appropriate material, such as aluminum, via diamond turning methods or a helical surface can be produced on an aluminum cylinder through machining and polishing techniques.

Alternatively, a mold for a helicoid optical element 12 or 14 can be manufactured via diamond turning methods. Subsequent helicoid optical elements 12 or 14 can be manufactured of plastic using the mold produced from the diamond turning methods. The plastic helicoid element is then plated with specularly reflective material. Other methods of producing a machined and polished helix will be known to one skilled in the art.

Figure 9:
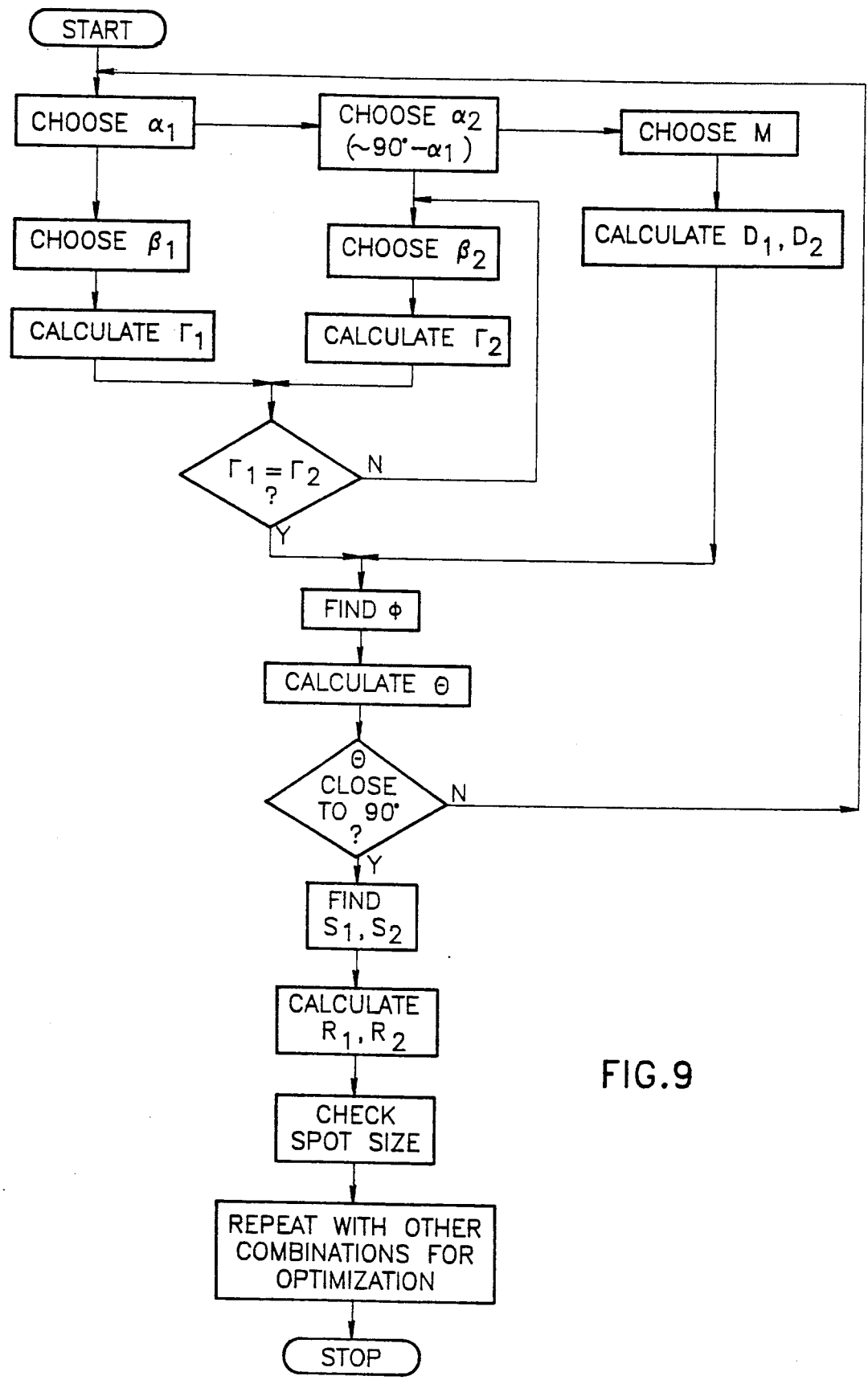
FIG. 9 is a flow chart illustration of a method of desiging suitable helicoid optical elements of FIG. 1A.

Reference is now briefly made to FIG. 9 which illustrates, in flow chart format, a method for designing a scanning apparatus of the present invention given a desired helicoid length L. The pitch angles $\alpha_i$ are typically chosen first, as described hereinabove, in accordance with the amount of space available for the helicoid optical elements 12 and 14. As discussed hereinabove, from $\alpha_i$ are defined the diameters $D_i$ and the number M of turns of the helical surface 18.

The $\beta_i$ are then defined so as to ensure that light beam 24, the output beam of the scanner of the present invention, is perpendicular to axis 15. To this end, $\Gamma_i$ (not shown) are calculated wherein $\Gamma_i$ and $\Gamma_2$ are defined as follows. $\Gamma_1$ is the skew angle between beam 22 and axis 13 of helical surface 16. $\Gamma_2$ is the angle between beam 22 and axis 15 of helical surface 18 which will produce the desired reflection angle between axis 15 and the output beam 24. $\Gamma_i$ and $\Gamma_2$ must be equal. If the $\Gamma_i$ are not equal, a new value for $\beta_2$ is chosen and the calculations repeated until the $\Gamma_i$ are equal. If by changing only $\beta_2$ a solution cannot be found, new values for the $\alpha_i$ and $\beta_i$ are chosen.

From the above defined angles, the working point, or angle, $\phi$ of light beam 11 on helical surface 16 is then calculated. The angle $\phi$ is checked and if it is not sufficiently close to 90°, the whole process is repeated.

If helical surfaces 16 and 18 are concave curves, the distances $S_1$ and $S_2$ are defined and thus, their radii of curvature $R_i$ or the second order curve functions defining the curvatures are defined.

Finally, the spot size is checked to ensure that it satisfies the required resolution, the distances $S_3$ and $S_4$ and the relative location of medium 20 with respect to helical surface 18 are all defined. After the definition of $S_3$ and $S_4$, the phase angle is found through ray tracing to ensure that beam 22 impinges upon helical surface 18.

The abovedetailed calculations are repeated to define an optimal configuration in accordance with the operational requirements defined for the scanner.

Annex A details the calculations for defining the mirror plane equation given the angles $\alpha_i$ and $\beta_i$ for a specific example. Annex B details the equations for calculating the position of the two helices that satisfy the conditions described hereinabove. The angles tau and xsi are, respectively, the angles of rotation at the points of reflection on the helical surfaces 16 and 18, and are equivalent to $\phi$. It will be appreciated that, if the result of the calculations of Annex B is physically impractical for system implementation, new values for the angles $\alpha_i$ and $\beta_i$ are chosen and the calculations are repeated.

For example, for an apparatus such as shown in FIG. 1A, the $\alpha_i$ are 45°, the $\beta_i$ are 54.73561° and $\phi$ is 35.2644°. The helicoid diameters are 289.66 mm, $S_3$ is 73 mm and $S_4$ is 150 mm. The $R_i$ are calculated according to ray tracing techniques.

Figure 5:
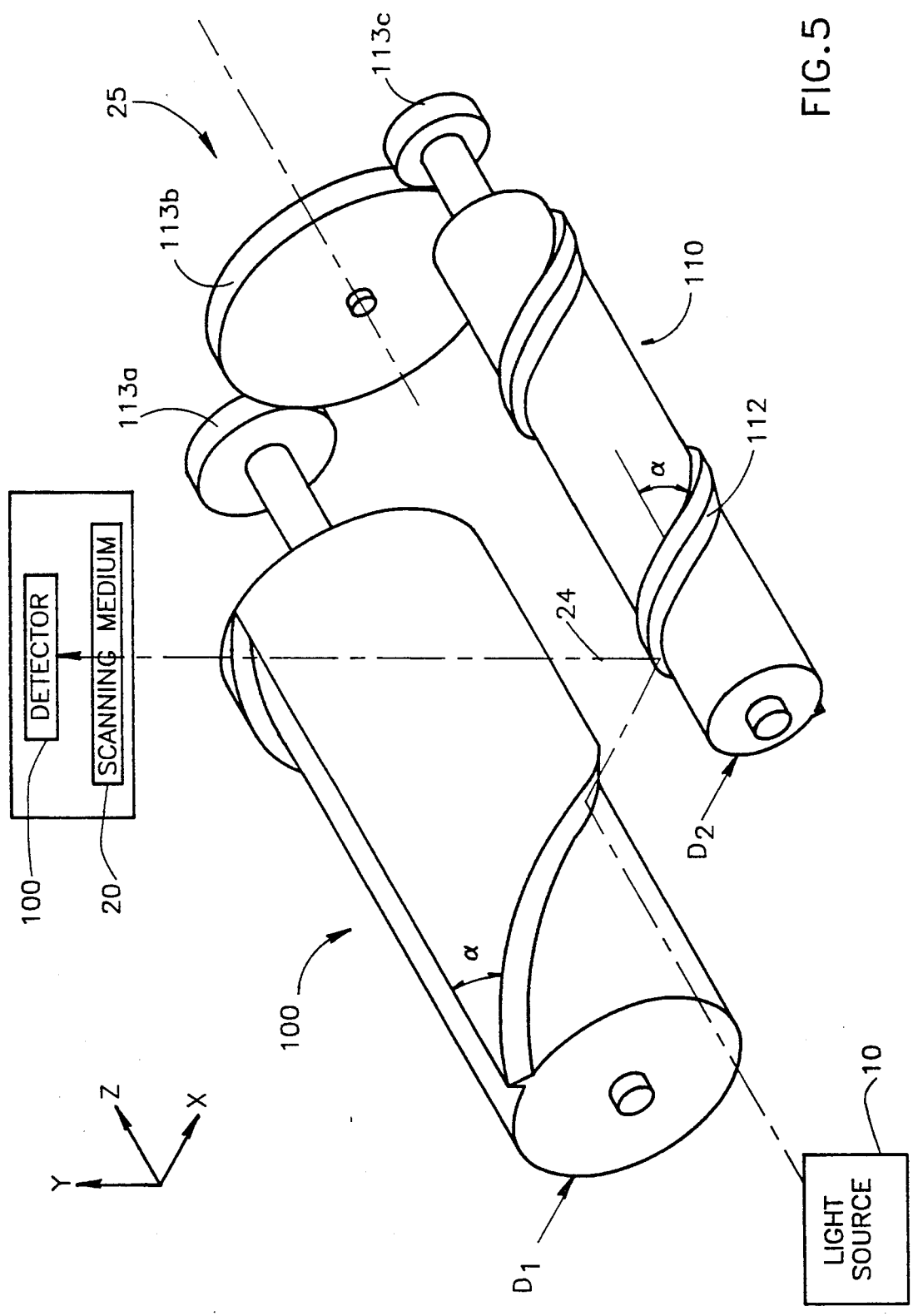
FIG. 5 is a schematic illustration of the device of FIG. 1A with two helicoid optical elements of different diameters but identical pitch angles.

Reference is now made to FIG. 5 which illustrates an alternative embodiment of the present invention utilizing two helicoid optical elements 100 and 110 of different diameters $D_1$ and $D_2$ but identical pitch angles $\alpha$, where $\alpha$ is 45°. Since $D_1$ is twice $D_2$, helicoid optical element 110 has two turns of a helical surface 112 and rotates twice for every rotation of helicoid optical element 100. Thus, if, for example, the rotating means 25 comprise gears 113, gear 113c which rotates helicoid optical element 110 is half the size of gear 113a.

The embodiment shown in FIG. 5 has advantages of size with respect to the embodiment of FIG. 1A. If it is desired to maintain a 45° pitch angle on both elements 100 and 110 but space available for the optics is limited, the diameter $D_2$ of the helicoid element 110 can be reduced in accordance with this embodiment and with equation 2.

The apparatus of FIG. 5 is configured for reading an image on medium 20. In this embodiment, light beam 24 illuminates medium 20 to be scanned. The transmitted or reflected light is detected by a detector 101, such as a strip of light-sensitive material.

Figure 6:
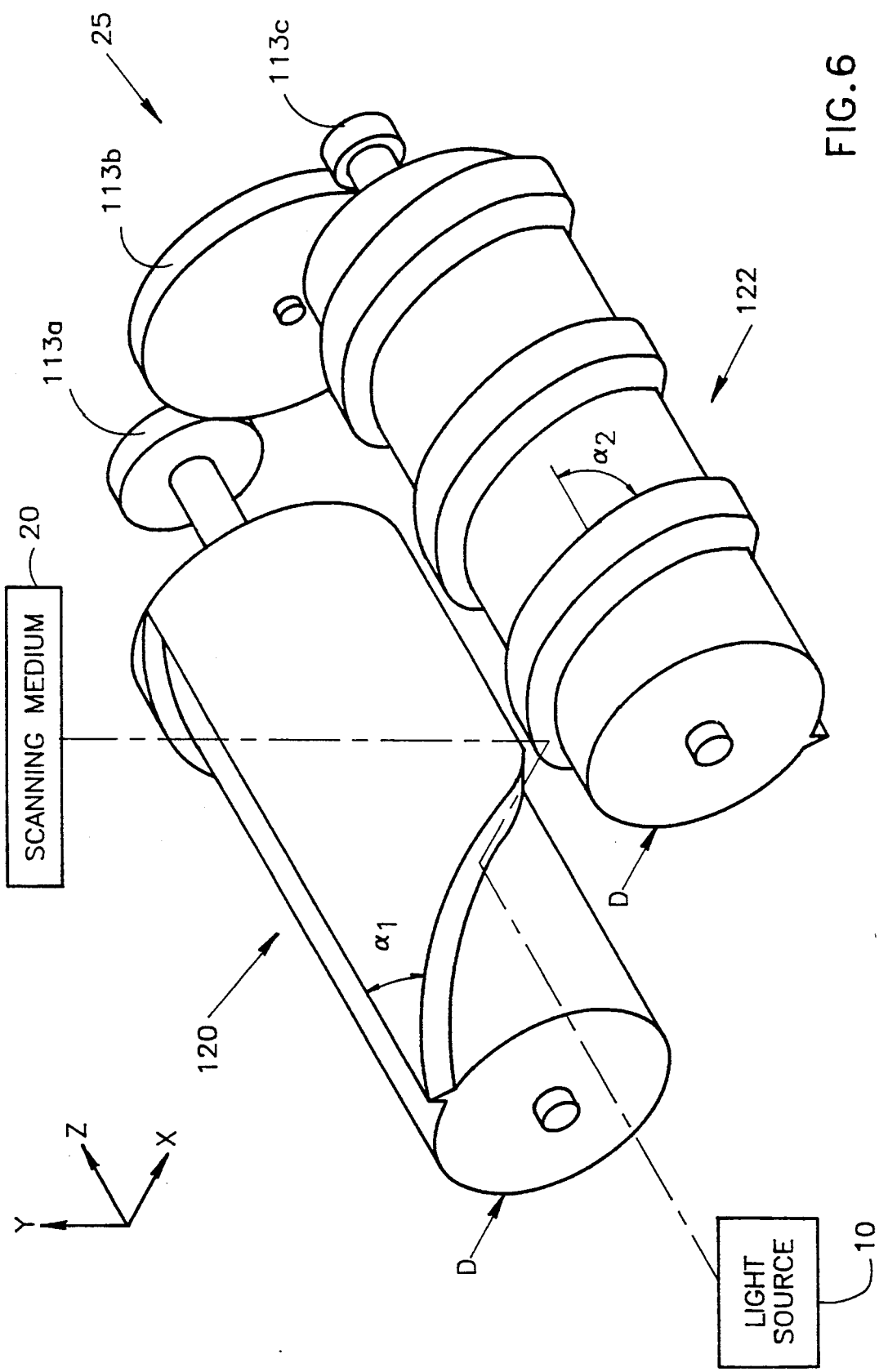
FIG. 6 is a schematic illustration of the device of FIG. 1A with two helicoid optical elements of generally identical diameters but different pitch angles.

Reference is now made briefly to FIG. 6 which illustrates a further alternative embodiment of the invention of FIG. 1A. In this embodiment, the diameters of the helicoid optical elements, labelled 120 and 122, are identical and are marked D, but the pitch angles $\alpha_1$ and $\alpha_2$ are different. For this embodiment, $\alpha_1$ is 30°, $\alpha_2$ is 60°, $\beta_1$ is 34°, $\beta_2$ is 49° and $\phi$ is 56°. The number of rotations of a helical surface 123 of helicoid optical element 122 is three and thus, the helicoid optical element 122 is rotated at a speed thrice that of helicoid optical element 120.

Figure 7A:
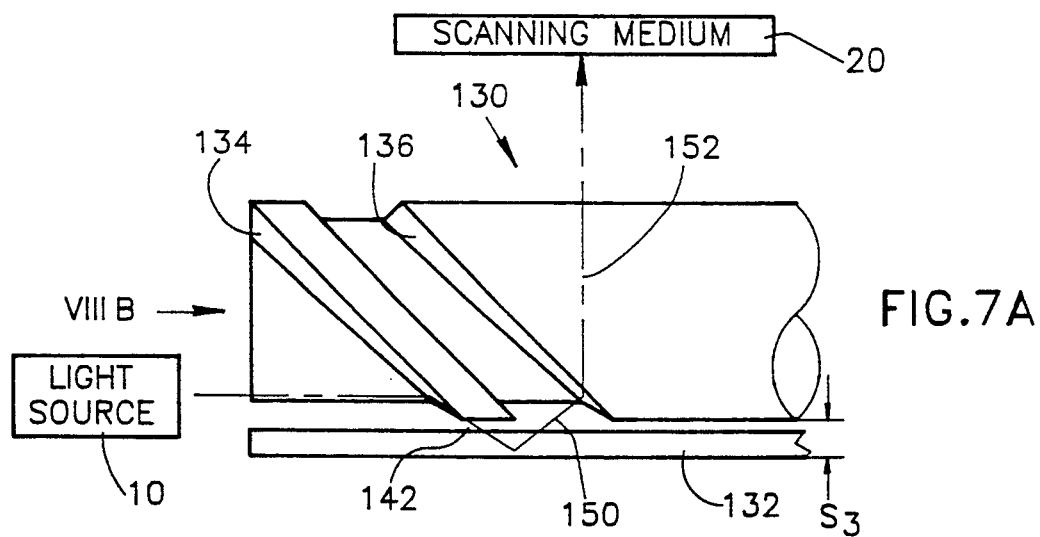
FIGS. 7A and 7B are side and end view illustrations, respectively, of the device of FIG. 1A with a reflecting prism and a single rotating drum having two helical surfaces.
Figure 7B:
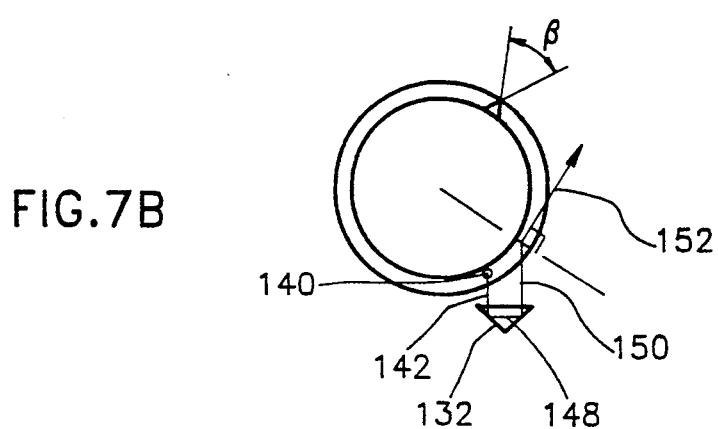

Reference is now made to FIGS. 7A and 7B which illustrate in side and end views, respectively, an alternative embodiment of the scanner of the present invention which utilizes a prism 132 and a single drum 130 comprising two curved helical surfaces 134 and 136 with identical pitch angles $\alpha$ of 45°. Helical surface 136 is phase shifted from helical surface 134 as defined in accordance with a distance $S_3$ between drum 130 and prism 132. Prism 132 is generally, although not necessarily, a 90° prism. It, alternatively, can be replaced by a couple of mirrors typically but not necessarily placed orthogonal to each other.

The scanner of FIGS. 7A and 7B operates as follows. A light beam 140 is reflected from helical surface 134 to prism 132 as light beam 142. From the surfaces 144 and 146 of prism 132, light beam 142 is reflected, as beams 148 and 150, through the prism 132. Beam 150 is reflected towards helical surface 136 of drum 130 which reflects the beam 150, as beam 152, towards the medium 20. Thus, prism 132 is operative to reflect the light beam 142 back onto the drum 130. In this manner, a single drum 130 can be utilized, thereby removing the requirement in the previous embodiments to exactly match the rotation of two helicoids while preserving the advantages of having two helical surfaces.

It will be appreciated that if distance $S_3$ is sufficiently small relative to the diameter of drum 130, only one helical surface 144 is necessary.

An example of embodiment of FIGS. 7A and 7B, has the angles as follows: $\phi$ is 35.26°, the $\beta_i$ are 55.7356° and the $\alpha_i$ are 45°.

Figure 8:
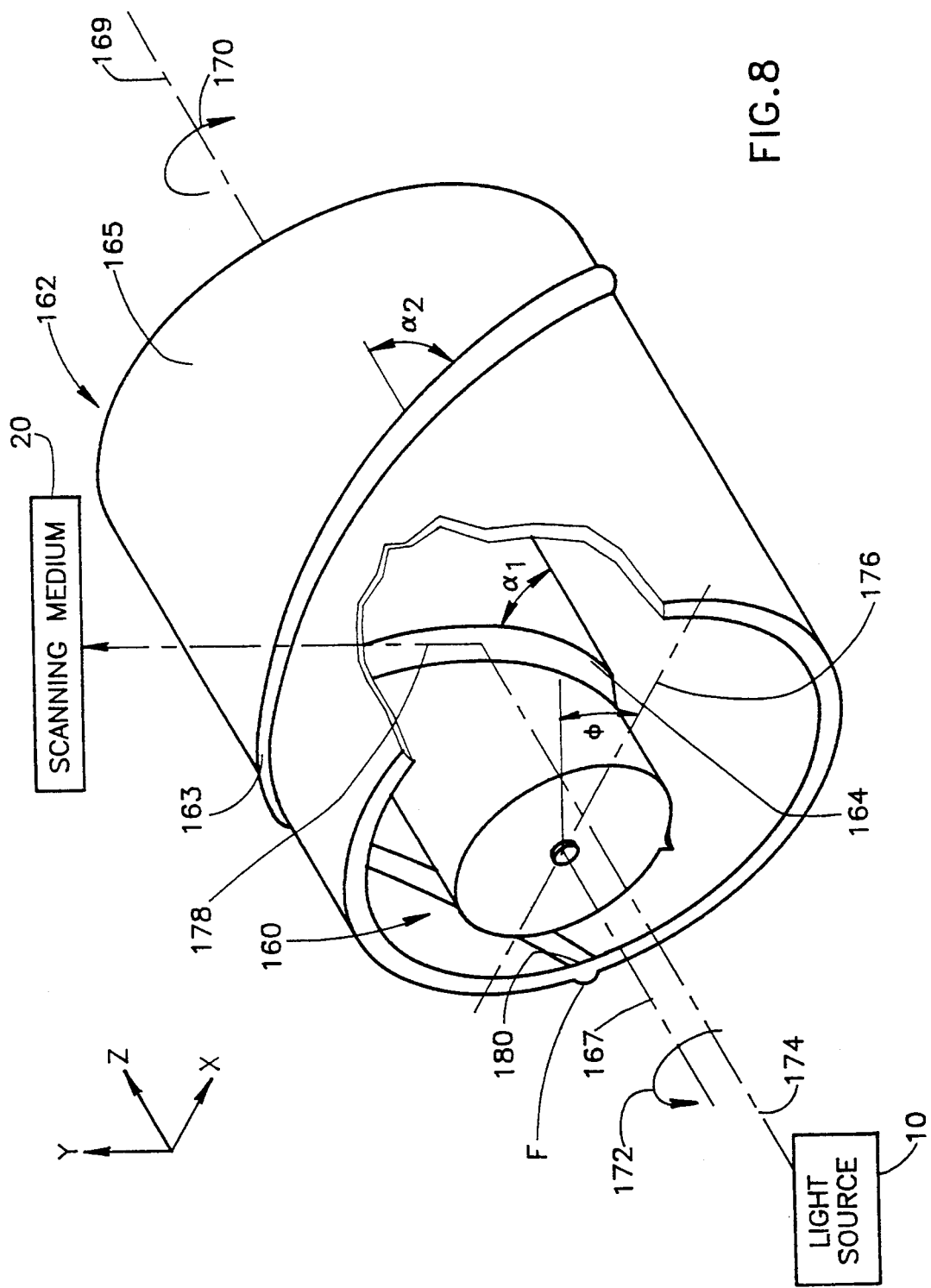
FIG. 8 is a schematic illustration of the device of FIG. 1A where a reflective helicoid optical element is located inside a transparent refractive helicoid optical element with a diameter larger than that of the inner reflective helicoid optical element.

Reference is now made to FIG. 8 which is an isometric view of an embodiment of the present invention utilizing an internal and an external helicoid optical element 160 and 162, respectively. Internal helicoid optical element 160 is an element similar to elements 12 and 14 of FIG. 1A with a diameter $D_1$ and a concave helical surface 164. External helicoid optical element 162 is typically formed of a cylindrical lens 163 twisted to form a helix of a diameter $D_2$ greater than diameter $D_1$ attached to a hollow drum 165.

In this embodiment, a light beam 174 impinges upon helical surface 164 at a location which is at angle $\phi$ to a horizontal line 176. Helical surface 164 reflects light beam 174 as light beam 178 in a direction generally perpendicular to an axis 167 of helicoid optical element 160. Light beam 178 impinges upon cylindrical lens 163 whereupon it is focused onto medium 20. Cylindrical lens 163 is operative for focusing as well as some angular deviation, if necessary. The focal length of the cylindrical lens 163, marked F in FIG. 8, is dependent on its radius of curvature $R_2$ and on the material of which it is made. If the light beam 178 impinges off-center on lens 163, then angular deviations of the light beam 178 can be corrected.

The pitch angles $\alpha_i$ can be identical or different, as in the previous embodiments, within the conditions that the angle $\phi$ between their projections along the axis of light beam 174 be as large as possible and maximally be 90°. As in previous embodiments, helical surface 164 is inclined by an angle $\beta_1$. It will be noted that lens 163 is not inclined; however, its inner surface 180 can be curved so as to shape light beam 178 or it can be flat.

In this embodiment, the direction of twist and of rotation of helical surface 164 and of helicoid optical element 162 are opposite. The directions of rotation are indicated by arrows 170 and 172.

Axes of rotation 167 and 169 of the two elements 160 and 162, respectively, do not typically coincide so as to ensure that light beam 178 will impinge upon cylindrical lens 163.

In the embodiment of FIG. 8 $\alpha_1$, the pitch angle of helicoid optical element 160 has a righthanded twist and the pitch angle $\alpha_2$ of helicoid optical element 162 has a lefthanded twist. Examples values of the angles are: $\alpha_1$ is 55°, the inclination angle $\beta_1$ is 45°, $\alpha_2$ is 70° and $\phi$ is 45°.

It will be appreciated that, as in previous embodiments, the helical surface 164 and lens 163 are phase shifted from each other to ensure that light beam 178 hits lens 163 upon leaving helical surface 164. It will also be appreciated that the angles $\beta_1$ and $\phi$ are arranged such that light beam 178 leaves lens 163 in a direction perpendicular to line 169.

Helicoid optical element 162 can be manufactured by creating a helical slash within drum 165 to which is attached a helically twisted cylindrical lens 163. Such a drum and lens can be made of transmissive plastic or any other suitable material. Alternatively, helicoid optical element 162 can be produced via plastic molding techniques.

It will be appreciated by persons skilled in the art that the addition of optical elements at any position along the optical path to improve the shape and focusing of the light beam is possible within the framework of the present invention.

It will be appreciated by persons skilled in the art that the present invention is not limited to what has been particularly shown and described hereinabove. Rather the scope of the present invention is defined only by the claims which follow.

We claim:

1. Scanning apparatus comprising:
   a light source for providing at least one light beam;
   a medium for receiving said at least one light beam; and
   two helical optical means disposed between said light source and said medium for sequentially receiving said at least one light beam and for directing said at least one light beam towards said medium.

2. Scanning apparatus according to claim 1 and wherein said two helical optical means have first and second specularly reflecting helical surfaces wherein said first helical surface is operative for receiving said at least one light beam from said light source and for directing it to said second helical surface and wherein said second helical surface is operative for receiving said at least one light beam from said first helical surface and for directing it to said medium.

3. Scanning apparatus according to claim 2 and wherein said first and second helical surfaces have diameters of different sizes.

4. Scanning apparatus according to claim 2 and wherein said first and second helical surfaces have diameters of generally identical sizes.

5. Scanning apparatus according to claim 2 and wherein said first helical surface completes one turn per scan.

6. Scanning apparatus according to claim 2 and wherein said specularly reflecting surfaces are flat.

7. Scanning apparatus according to claim 2 and wherein each of said specularly reflecting surfaces has a constant radius of curvature.

8. Scanning apparatus according to claim 2 and wherein each of said specularly reflecting surfaces has a curvature defined by a higher than second order curve.

9. Scanning apparatus according to claim 1 and wherein said two helical optical means comprise two specularly reflecting helical surfaces combined in a single helicoid optical element.

10. Scanning apparatus according to claim 9 and including a prism.

11. Scanning apparatus according to claim 9 and including two mirrors.

12. Scanning apparatus according to claim 1 and wherein a first helical optical means comprises a helical optical element housed within a second helical optical means, said second helical optical means being a cylindrical lens twisted to form a helix.

13. Scanning apparatus comprising:
    a light source for providing at least one light beam;
    a single helical surface for receiving and reflecting said at least one light beam; and
    reflecting means located generally close to said single helical surface for receiving said at least one light beam reflected from a first location on said single helical surface and for reflecting said at least one light beam to a second location on said single helical surface; and
    a medium for receiving said at least one light beam reflected from said second location.

14. Scanning apparatus according to claim 13 and wherein said reflecting means comprise a prism.

15. Scanning apparatus according to claim 13 and wherein said reflecting means comprise two mirrors generally but not necessarily placed orthogonal to each other.

16. Scanning apparatus according to claim 13 wherein said medium is transparent and also including a detector located near said medium for detecting light through said medium.

17. Scanning apparatus according to claim 13 wherein said medium is non-transparent and also including a detector located near said medium for detecting light reflected from said medium.

18. A method of scanning a medium including the steps of:
providing at least one light beam;
receiving said at least one light beam on a first helical optical means and reflecting and shaping it to a second helical optical means;
receiving said at least one light beam on said second helical optical means and reflecting and shaping it to said medium; and
repeating said step of providing and both steps of receiving while rotating said first and second helical optical means.

19. A method according to claim 18 wherein said first helical optical means is located inside said second helical optical means and wherein said step of repeating is performed while rotating in opposite directions.

20. A method according to claim 18 and wherein said step of repeating is performed while rotating said first and second helical optical means in an identical direction.

21. A method of scanning a medium including the steps of:
providing at least one light beam;
receiving said at least one light beam on a helical surface and reflecting said at least one light beam reflected from a first location on said helical surface to reflecting means located generally very close to said helical surface;
reflecting said at least one light beam reflected from said reflecting means to a second location on said helical surface; and
receiving said at least one light beam reflected from said second location on said medium.

* * * * *